Dec. 23, 1941. H. E. BARTSCH Re. 21,982
RETICULATED METAL STRUCTURE
Original Filed Jan. 23, 1937
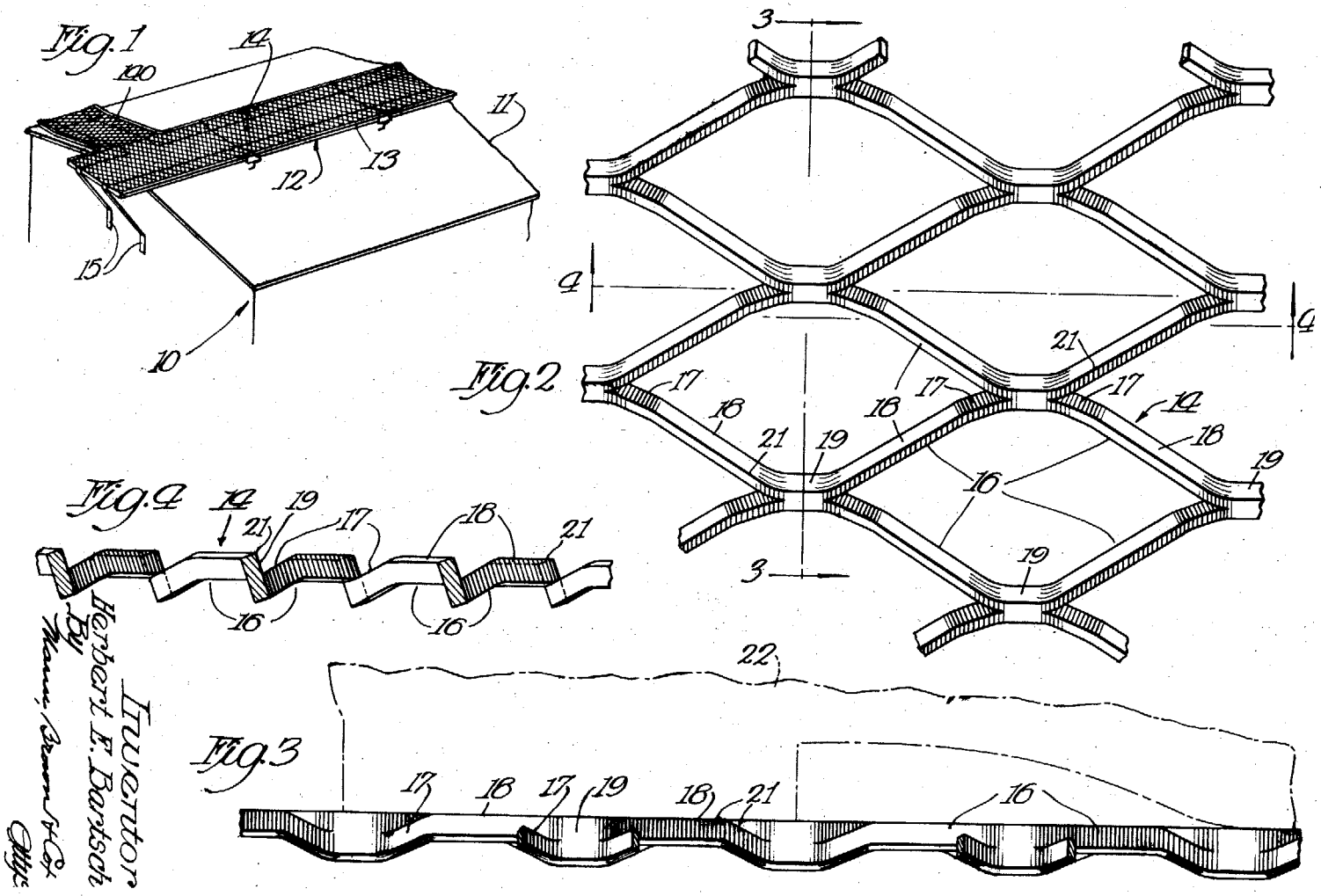

Reissued Dec. 23, 1941

Re. 21,982

UNITED STATES PATENT OFFICE 21,982

RETICULATED METAL STRUCTURE

Herbert E. Bartsch, Chicago, Ill., assignor to Universal Railway Devices Company, a corporation of Delaware Original No. 2,227,874, dated January 7, 1941, Serial No. 302,582, November 2, 1939, which is a division of Serial No. 252,373, January 23, 1937. Application for reissue August 19, 1941, Serial No. 407,507

5 Claims. (Cl. 94—5)

This invention relates to metallic constructions and more particularly to reticulated metal structures.

In the use of reticulated metal for running boards for motor vehicles, treads for fire escapes, steps and running boards for railway cars, and the like, it is desirable that the exposed surface be such as to insure against slipping or sliding and to guard against accidents. In order to promote safety in such structures, it is desirable that the construction be such that the shoe soles of the person walking on such surface shall engage a maximum area as otherwise there is ever present the danger of the foot improperly engaging the surface and slipping or skidding thereby causing a turning or twisting of the foot which might result in grave consequences or even in serious accidents.

The present invention seeks to avoid these difficulties by the provision of a new and improved structure which is preferably formed of expanded metal having a great amount of the upper cut portions or strands in a common plane with the upper surface of the uncut portions or webs.

Another object of the invention is the provision of a new and improved expanded metal tread that not only provides an extended sole engaging surface but is also provided with anti-slipping means.

A further object of the invention is the provision of new and improved expanded metal suitable for treads for various structures but is also adapted for other uses such as a support on which clerks and attendants at soda fountains and bars may stand while serving cold drinks to customers in order to protect them from the liquids that may have been spilled on the floor.

Other and further objects and advantages of the invention will appear from the following description, taken in connection with the accompanying drawing, in which Fig. 1 is a perspective view of a portion of a railway car showing one embodiment of the invention applied thereto;

Fig. 2 is a plan view of a tread embodying the invention and made, as is preferred, of expanded metal; and Figs. 3 and 4 are sections on the lines 3—3 and 4—4 of Fig. 2.

Referring now to the drawing, the reference character 10 designates a railway car having a roof 11 on which is mounted the running board 12 which comprises a frame member 13 to which is secured the tread portion 14. The tread portion comprises a reticulated sheet, preferably of expanded metal, embodying the present invention. The opposite side edges of the tread extend upwardly and outwardly in the running board, as shown in Fig. 1.

The running board 12 is provided with a lateral at the end of the car as shown at 140 in Fig. 1. The board extends beyond the car end and is supported by braces 15 in the usual manner. Since the details of the supporting frame are shown and described in my copending application, Serial No. 252,373, filed January 23, 1937, of which this is a division, and since these details constitute no part of the present invention, it is not thought necessary to further illustrate or describe the same.

In the construction of conventional lengths of expanded metal, it is common practice to so cut and form the expanded sheet that the connecting or cut portions thereof, which are within the scope of the term "strands" as used herein, will be more or less straight and will extend in a substantially straight line from the lower part of an uncut portion, which is one type of "web" as that term is used herein, to the upper part of an adjacent uncut portion, and as a result no more than a minor part of the uncut portion forms the tread when used as a step or running board. In a preferred form of embodiment of the present invention this difficulty is remedied by the provision of an expanded metal strip in which the cut portion of the strip has a very large part of its length straight and horizontal and in the plane of what for convenience of description will be termed the tread or upper surface of the uncut portions of the strip.

As shown, the strip 14 has the connecting members 16 of the expanded strip extending upwardly and laterally as at 17, Fig. 4, and then has the major part of the cut portion extending laterally horizontally as at 18 so that these horizontal portions will be in a common plane with one another and with the upper surface of the uncut portions 19, as shown more clearly in Fig. 4.

The connecting portions 16 have one of their edges 21 extending above the other, that is, the connecting portions, which are substantially rectangular in cross-section, are slightly twisted so that one edge is above the others and this edge, being more or less sharp, tends to bite into the shoe sole or heel to a certain extent thereby constituting anti-slipping means for the tread.

It will thus be seen that with such an arrangement, the shoe 22 of a person walking on the surface of the tread 14, Fig. 3, will not only engage a major portion of the upper surface of the tread but the side edges 21 will tend to prevent slipping or sliding in any direction of the shoe sole and heel along the surface of the tread.

It is thought from the foregoing, taken in connection with the accompanying drawing, that the construction of my device will be apparent to those skilled in the art and that changes in size, shape, proportion or details may be made without departing from the spirit and scope of the appended claims.

I claim:

1. A sheet of reticulated metal adapted to be supported as a tread surface comprising a series of integrally connected webs and strands each substantially polygonal in cross section, said webs being staggered and spaced with respect to each other, said webs having their upper, top edges in a single plane and each strand extending from the bottom of one of the webs to the top of an adjacent web and each having a portion inclined upwardly, and a substantial portion of the strand extending in said plane to provide an anti-slip tread.

2. A sheet of reticulated metal adapted to be supported as a tread surface comprising a series of integrally connected webs and strands each substantially polygonal in cross section, said webs being staggered and spaced with respect to each other and inclined with respect to the plane of the sheet, said webs having their top edges in a single plane, and each strand extending from the bottom of one of the webs to the top of an adjacent web and having a portion inclined upwardly and a substantial portion of each strand extending in said plane to provide an anti-slip tread.

3. A sheet of reticulated metal adapted to be supported as a tread surface comprising a series of integrally connected webs and strands each substantially polygonal in cross section, said webs being staggered and spaced with respect to each other and having their top edges in a single plane, and each strand extending from the bottom of one of the webs to the top of an adjacent web and each having a relatively short portion inclined upwardly and a substantial portion of the strand extending in said plane and being inclined to provide a relatively sharp edge in said plane to provide an anti-slip tread.

4. A sheet of reticulated metal adapted to be supported as a tread surface comprising a series of integrally connected webs and strands each polygonal in cross section, said webs being staggered and spaced with respect to each other and having their top edges in a single plane and inclined with respect to said plane, and each strand extending from the bottom of one of the webs to the top of an adjacent web and having a relatively short portion inclined upwardly and a substantial portion of the strand extending in said plane and being inclined to provide a relatively sharp edge in said plane to provide an anti-slip tread.

5. A sheet of reticulated metal comprising a series of integrally connected webs and strands each substantially polygonal in cross-section, said webs being staggered and spaced with respect to each other, said webs having their upper, top edges in a single plane and each strand extending from the bottom of one of the webs to an adjacent web and each having a portion inclined, said inclined portions extending upwardly to said plane at points spaced material distances from said webs, each of said strands having a portion in said plane cooperating with said webs to form anti-slip tread surfaces in said plane.

HERBERT E. BARTSCH.